United States Patent Office 2,717,840
Patented Sept. 13, 1955

2,717,840
METHOD OF FORMING A COATING OF METAL ON GLASS

Carl Bosch, Westfield, N. J., assignor, by mesne assignments, to Fox, Wells and Company, New York, N. Y., a partnership No Drawing. Application February 25, 1952,
Serial No. 273,353

2 Claims. (Cl. 117—70)

This invention relates to solder composition and method for the use thereof.

It has for an object the provision of a solder which may be used for soldering glass, quartz, mica, sapphire, ceramic material and arsenic sulphide and the like to each other or to metal and to provide methods for such use of such a solder composition.

It has been proposed heretofore to solder glass to glass or glass to metal by the use of a solder composition. It was proposed to preheat the glass to a temperature of about 250° F., remove the glass from the heat and wipe on an alloy with a swab or brush. By rubbing the alloy onto glass at a temperature when the alloy is in a pasty condition, the solder alloy was to adhere to the glass. After such coating of the parts to be joined, it was proposed to reheat the work in a furnace above the melting point of the solder to fuse the coatings together. A difficulty in connection with this composition and process was the necessity of preheating and reheating the entire body of glass to the relatively high temperature of 250° F. or higher. This, of course, would prevent the use of said process for soldering optical parts such as compound lenses or large pieces of glass. Raising the temperature of a compound lens to 250° F. would cause disintegration of the cement used between the lens surfaces and would cause an undue strain in the glass and between the metal and glass because of thermal expansion.

It is, therefore, an object of the present invention to provide a solder composition and methods for its use involving the application of only local heat to that part of the work piece of glass or one of the other materials mentioned above to which solder is to be applied.

An alternative object is to provide a solder composition which is "pasty" through a very wide range of temperature, this pastiness being obtained not by choosing a composition far removed from the eutectic point but by adding suitable inert substances that remain in the solid state at the soldering temperature.

Other objects will become apparent from the following description of various compositions, methods, and apparatus illustrating the invention.

A suitable solder composition to meet these requirements is based on the use of the metal indium. Pure indium is known to have the characteristic of wetting glass and similar non-metallic materials and alloys of tin, lead, cadmium, bismuth, and zinc with suitable amounts of indium are also known to have that characteristic. Indium and the indium alloys mentioned may, accordingly, be used as solders with the materials referred to, if the surfaces to be joined are properly prepared for soldering. The indium-tin alloy having an indium content of 40%–60% is especially advantageous because of its relatively low melting point and vapor pressure.

A preferred method of use is as follows: That part of the surface of the glass, etc. to which solder is to be applied is first cleaned to remove all traces of grease, hydrocarbons, and halogen-containing compounds. For this purpose an inorganic detergent such as an alkaline solution may be used, the glass being subsequently rinsed with distilled water and thereupon allowed to dry. In some cases, priming with an alkali-silicate solution such as a solution of potassium silicate or sodium silicate of from 0.1% to 50% concentration will be found advantageous. The concentration of the primer depends on the roughness of the surface and the rougher the surface the higher the concentration required. After application of the primer, it is allowed to dry on the surface. The soldering tool is thereupon heated to a temperature somewhat above the melting point of the alloy and the solder applied thereto. The thus "tinned" soldering tool is thereupon applied to that part of the glass or other material to which solder is to be applied. The work piece may be at ordinary room temperature. The soldering tool is preferably rubbed back and forth on the work piece to spread the solder and the solder is thus caused to form a film on the work piece which has been raised to the required temperature by the transfer of heat from the soldering tool and solder to the work piece. To the solder-coated area of the work piece (either while the solder is still molten or after it has solidified) is now applied another piece of glass or one of the other materials mentioned, preferably similarly coated, or metal to which the first mentioned piece is to be soldered. The hot soldering tool is now passed along the joint between the two pieces causing the solder coating or coatings thereon to be fused together, thus forming a good tight soldered joint. The solder composition mentioned above is sufficiently soft, viz. has sufficient cold flow, to allow for stresses due to the difference in the rate of expansion of the different materials.

An ordinary soldering tool having a copper tip is satisfactory although a nickel-iron alloy, or a cupro-nickel alloy may be preferable for certain purposes.

When the solder is used in liquid form, as above described, it is necessary to keep the work as clean as possible, since traces of contaminations will cause the solder to form droplets or globules due to its relatively high surface tension. This tendency can be overcome, if desired, by using a solder composition which remains "pasty." This is accomplished not by working within a narrow temperature range, but by adding one or more inert solid substances such as finely powdered material such as aluminum oxide, magnesium oxide, zinc oxide, tin oxide, glass powder, or quartz powder, etc. It has been found that under certain conditions such a solder will adhere in spite of traces of contaminating material. It has also been found that under certain conditions such a solder will also adhere to rough surfaces of glass, porcelain, etc., especially if the solder is spread by rubbing. Since the pastiness is achieved by the addition of materials which remain solid at the highest temperature involved, accurate control of temperature is not necessary, which is not true of an all metal solder composition which can be maintained in the pasty condition only by holding a non-eutectic composition within a closely controlled range of temperature.

Another way to provide a paste forming solder composition consists in starting with alloys of indium, with aluminum, magnesium, tin or zinc. By heating such alloys to a sufficiently high temperature and exposing them to oxygen, the oxides of aluminum, magnesium, tin or zinc in very finely dispersed form will be produced.

Another way to provide a paste forming solder composition consists in adding a small amount of sulphur to indium or an indium alloy. This results in the formation of sulphides which have effects similar to those of the oxides mentioned.

It has been found that indium alloys do not adhere as well to rough or ground glass or ceramic surfaces as on polished or glazed surfaces. It has been found that in such cases use of one of the paste forming solder compositions described above will considerably improve the bond, particularly if energetic spreading of the heated solder composition is employed. This may be due to the abrasive action of the paste forming ingredients. The newly exposed abraded surfaces, being covered by the molten solder, are quickly coated by solder before they are subjected to possible contamination.

An important advantage of the several types of indium containing solders described above is that they can be used by a local application with a soldering tool and the fact that for glass, quartz, mica, sapphire, glazed porcelain, arsenic sulphide, and practically all other materials, no flux of any kind is necessary to make the bond. The surface having been previously cleaned and precoated with the solder, the solder joint itself is made simply by touching the joint with the tool sufficiently long to apply the necessary heat to obtain fusion. This is a very great advantage for work in intricate and complicated apparatus such as electrical, optical, and high vacuum apparatus where cleanliness is most important. When flux is used, some of it always remains, so that its use is most disadvantageous with certain apparatus where its presence might serve to attack delicate apparatus such as insulators, condensers and the like through direct contact or through action of its vapors.

In order to wet the soldering tool, it is important that all contaminating substances be first removed therefrom. The tool may then be wetted and for this two different methods are recommended.

1. Mechanical wetting by scratching the surface with a glass edge or other sharp, clean instrument, while the tool is hot and covered with the molten solder. This is continued until the surface is fully coated.

2. By indirect process whereby the tip is first coated with ordinary tin-lead or indium alloy solder using a flux containing no organic substances. This tinned tip is then carefully cleaned and washed with distilled water to remove all traces of the flux. The coated tip will then readily accept the indium solder.

What has been said above applies particularly to the soldering of glass, quartz, mica, sapphire, ceramic material and arsenic sulphide. The application of the solder to various metals depends entirely on their material.

Iron and copper, copper alloys, as brass and beryllium-copper, are indirectly wetted. First a very thin coating of ordinary tin-lead or indium alloy solder is preferably applied with a nonorganic flux. Afterwards, this flux is carefully removed by rinsing and washing with distilled water (or water with some ammonia added). After drying this coating will readily take the indium solder.

Sometimes another method can also be used for copper and brass: Wiping the surface with concentrated (30%) ammonia, followed possibly with water, will usually also give a good bond.

*Aluminum.*—After degreasing with an inorganic detergent, such as an alkali hydroxide, and washing with water the solder can be applied by gentle rubbing until it wets. Any process can be used with which the insulating aluminum oxide layer can be mechanically removed. Because of the high heat conductivity of aluminum, it is advisable to warm it slightly over the melting point of the solder. In this method the use of a soldering tool is obviously necessary because the wetting takes place only after the solder is spread mechanically. However, if sufficient heat is applied to the aluminum (or, for that matter, to any of the other metals mentioned) it is not necessary to use a soldering tool since any sharp clean instrument such as glass may be used to spread the solder and cause it to adhere to the metal.

*Magnesium.*—The application of solder is the same as with aluminum. In these two cases it is of great advantage that no flux be used since it is hard to remove and may corrode the joint.

*Stainless steel.*—If this material contains nickel it usually takes the solder readily after properly degreasing and washing with water. A slight rubbing, however, may improve the joint. The same is true of nickel.

In the case of arsenic sulphide, quartz, mica, sapphire, and glazed porcelain, the same method can be applied as with glass.

I claim:

1. A method of forming a coating of metal on a glass surface, which comprises cleaning the surface to remove greases, hydrocarbons, and halogen-containing compounds, applying a solution of an alkali metal silicate to the cleaned glass surface, thereafter placing upon the glass surface a molten metal product consisting of a member of the group made up of indium and the alloys of indium with tin, lead, cadmium, bismuth, and zinc, which have the glass-wetting properties of indium, and spreading the molten product over the surface to form the coating.

2. The method defined in claim 1, in which the alkali-silicate solution has a concentration of from 0.1% to 50%.

References Cited in the file of this patent

UNITED STATES PATENTS

| | | |
|---|---|---|
| 1,291,878 | Hess | Jan. 21, 1919 |
| 1,518,807 | Minter | Dec. 9, 1929 |
| 2,369,350 | Haven | Feb. 13, 1945 |
| 2,464,821 | Ludwick | Mar. 22, 1949 |
| 2,509,654 | Smith | May 30, 1950 |
| 2,516,663 | Zunick | July 25, 1950 |
| 2,623,273 | Murray | Dec. 30, 1952 |

OTHER REFERENCES

Metal Fnishing, November 1942, pp. 594, 596.
Scientific American, April 1944, pp. 154–156.
"Indium," pub. by the Indium Corp. of America, 1950, pp. 45, 46 and 222.
"Fusible Alloys Containing Tin," pub. by Tin Research Inst., England, September 1949, p. 3.
"Equilibrium Data for Tin Alloys," pub. by Tin Research Inst., September 1949, pp. 26 and 27.